United States Patent [19]

Ichinose et al.

[11] Patent Number: 5,433,783
[45] Date of Patent: Jul. 18, 1995

[54] SURFACE TREATMENT APPARATUS

[75] Inventors: Kiyohiro Ichinose; Hirofumi Hara; Hiroshi Ochiai; Eiji Kikuchi; Akihiko Tada, all of Sayama, Japan

[73] Assignee: Honda Giken Kogyo Kabushiki Kaisha, Tokyo, Japan

[21] Appl. No.: 41,342

[22] Filed: Apr. 1, 1993

Related U.S. Application Data

[63] Continuation of Ser. No. 580,680, Sep. 11, 1990, abandoned.

[30] Foreign Application Priority Data

| Sep. 26, 1989 | [JP] | Japan | 1-248169 |
| Jun. 12, 1990 | [JP] | Japan | 2-61279 |
| Jun. 12, 1990 | [JP] | Japan | 2-151679 |

[51] Int. Cl.⁶ .................................... B05C 3/02
[52] U.S. Cl. ........................... 118/416; 118/423
[58] Field of Search ............. 118/416, 409, 423, 425, 118/426

[56] References Cited

U.S. PATENT DOCUMENTS

| 3,105,776 | 10/1963 | Weymueller | 118/416 |
| 4,772,374 | 9/1988 | Urquhart et al. | 118/416 |
| 4,911,818 | 3/1990 | Kikuchi et al. | |

FOREIGN PATENT DOCUMENTS

| 10146437 | 6/1985 | European Pat. Off. |
| 584432 | 1/1947 | United Kingdom . |
| 1260092 | 1/1972 | United Kingdom . |
| 1395383 | 5/1975 | United Kingdom . |
| 2171935 | 9/1986 | United Kingdom . |

Primary Examiner—Steve Alvo
Attorney, Agent, or Firm—Nikaido, Marmelstein, Murray & Oram

[57] ABSTRACT

A surface treatment apparatus having a treatment bath for immersing and treating a workpiece therein with the workpiece being put into and taken out of said treatment bath by the lifting and lowering thereof and with the workpiece being rotated about a horizontal axial line while in the bath. A jig is provided for holding the workpiece having a pair of suspending points at each end thereof in symmetrical relationship about a horizontal axial line. Ropes suspend the jig with each one connected to one of the suspending points at each end of said jig. In a first embodiment, a pair of hoisting apparatuses are provided with upper ends of the ropes connected to suspending points on one side at both ends of the jig being connected to one of the hoisting apparatuses and upper ends of the ropes connected to suspending points on the other side at both ends of the jig being connected to the other of the hoisting apparatuses. In a second embodiment, a pair of jig-rotating wheels are fixed on the same horizontal axial line at both ends of the jig. The ropes for suspending the jig are respectively wound around the jig-rotating wheels. A pair of hoisting apparatuses are provided with one end of each of the ropes being connected to one of the hoisting apparatuses and the other end of each of the ropes being connected to the other of the hoisting apparatuses. In a third embodiment four ropes are used, and in a fourth embodiment a pair of shaft extension portions are used instead of wheels.

9 Claims, 9 Drawing Sheets

FIG_7

SURFACE TREATMENT APPARATUS

This application is a continuation of application Ser. No. 07/580,680 filed Sep. 11, 1990, now abandoned.

BACKGROUND OF THE INVENTION

This invention relates to an apparatus for surface treating workpieces such as vehicle bodies by immersing them into a treatment bath for performing a surface treatment such as chemical treatment, electrodeposition or the like.

An apparatus of this type is disclosed in Japanese Published Unexamined Patent Application No. 229167/1988. The apparatus includes a jig for holding a vehicle body provided at a treatment station where a treatment bath is placed. The jig can be lifted and lowered and can be pivoted or rotated about a horizontal axial line which extends in the direction of the length of the vehicle body. The vehicle body is transported to the treatment station by a hanger conveyor and is received by the jig. The vehicle body is put into and taken out of the treatment bath by lowering and lifting the jig and is rotated between a horizontal posture and a "lie-on-side" posture. In this apparatus, by putting the vehicle body into the treatment bath in the "lie-on-side" posture, the resistance at the time of putting it into and taking it out of the treatment bath is reduced, and the vehicle body is cleared of air trapped inside the vehicle body by inverting it after it has been put into the treatment bath.

In this kind of apparatus, the jig is rotatably supported between a pair of lifting frames which are provided on both sides of the treatment bath. The jig is arranged to be lifted by a power source for lifting the lifting frames. Another power source for rotating the jig is mounted on the lifting frame.

In this apparatus, the mechanism for lifting the jig becomes large and a driving source for rotating the jig is required in addition to a driving source for lifting and lowering the jig. This causes the overall apparatus to become complicated and expensive. While such an apparatus might be suitable for a mass production line, it is not suitable for experimental equipment or for production of a small number of products.

OBJECTS AND SUMMARY OF THE INVENTION

Taking the above problems into consideration, this invention has a first object of providing a simple apparatus which can put a workpiece into and take it out of a treatment bath and rotate the workpiece while in the bath.

In case the workpiece is transported by a hanger conveyor for successive immersions into a plurality of treatment baths, in order to further simplify the apparatus, it is preferable to hang the workpiece by a hanger so as to be lifted and lowered as well as to be rotated. It is a second object of this invention to provide an apparatus suitable for such a requirement.

In order to solve the first object, first through fourth systems are proposed according to this invention.

The first system is a surface treatment apparatus having a treatment bath for immersing and treating a workpiece therein with the workpiece being put into and taken out of the treatment bath by the lifting and lowering thereof and with the workpiece being rotated about a horizontal axial line while in the bath. A jig for holding the workpiece is suspended by a means for suspending which can be a pair of cables, wire ropes, chains or the like at a pair of suspending points at each end of the jig, the suspending points being in symmetrical relationship about the horizontal axial line. A pair of hoisting apparatuses are provided. The upper ends of the pair of ropes connected to suspending points on one side at both ends of the jig are connected to one of the hoisting apparatuses while the upper ends of the pair of ropes connected to suspending points on the other side at both ends of the jig are connected to the other of the hoisting apparatuses.

The second system is a surface treatment apparatus for use with a treatment bath and includes a jig having a pair of jig-rotating wheels comprising sprockets fixed on both ends of the jig with their centers on the same horizontal axial line. The jig is suspended by a means for suspending which includes a pair of chains which are respectively wound around the jig-rotating wheels. A pair of hoisting apparatuses are provided with one end of each of the chains being connected to one of the hoisting apparatuses and the other end of each of the chains being connected to the other of the hoisting apparatuses.

The third system is a surface treatment apparatus for use with a treatment bath and includes a jig for holding a workpiece having a pair of jig-rotating wheels fixed on the same horizontal axial line at both ends of the jig. The jig is suspended by a means for suspending which includes four wire ropes, with a pair at each end of the jig. The lower ends of each pair are fixed to one of the jig-rotating wheels and are wound therearound in the opposite directions to each other. A pair of hoisting apparatuses are provided. The four wire ropes are divided into two sets, each set having respectively two ropes of the same winding direction. The upper ends of two ropes of one set are connected to one of the hoisting apparatuses and the upper ends of two ropes of the other set are connected to the other of the hoisting apparatuses. In this system, the combination of the means for suspending and the jig-rotating wheel may be any of the combinations of wire and pulley, chain and pulley, and chain and sprocket.

The fourth system is a surface treatment apparatus also for use with a treatment bath and includes a jig wherein a pair of shaft extension portions are projectingly provided on the same horizontal axial line at both ends of the jig. A pair of bearing members are externally inserted onto the shaft extension portions and rotatably support the jig. The jig is suspended by a means for suspending which can include a pair of wire ropes, chains, cables or the like. The lower ends of the wire ropes are respectively fixed to the bearing members and the upper ends of the wire ropes are connected to one or two hoisting apparatuses. With this structure, the jig is lifted or lowered by the rotation of the hoisting apparatuses in one direction or in the opposite direction. A pair of guide frames for guiding the jig are vertically provided in the treatment bath and are engaged with the shaft extension portions when the jig is lowered. A pinion is provided on at least one of the shaft extension portions. A rack is provided in at least one of the guide frames for engaging with the pinion when the guide frames are engaged with the shaft extension portions.

In this system, one hoisting apparatus may be provided for each wire rope but, considering the equipment costs and the like, it is preferable to provide a common single hoisting apparatus to which the pair of wire ropes are connected.

According to the other features of this invention, in order to attain the second object, a supporting frame having guide wheels which guide each of the means for suspending in the above-mentioned first through fourth systems is fixed to a hanger of a hanger conveyor, and the hoisting apparatus structure is provided on the hanger.

According to the first system, by rotating the pair of hoisting apparatuses both in the direction of extending or winding up the wire ropes, the jig can be lowered or lifted while it is maintained in a horizontal posture. If the hoisting apparatuses are rotated in the opposite directions to each other, suspending points located on one side at both ends of the jig are lifted and the suspending points on the other side are lowered. Since the suspending points located on one side and the suspending points on the other side are symmetrically positioned relative to a horizontal axial line, which is the center of rotation, the jig can be rotated 90 degrees from horizontal posture respectively in one direction as well as in the other direction about the horizontal axial line.

According to the second system, when the pair of hoisting apparatuses are both rotated in the direction of extending the chains, one end of each chain connected to one of the hoisting apparatuses, and the other end of each chain connected to the other of the hoisting apparatuses are both extended out of the hoisting apparatuses, thus lowering the jig. When the hoisting apparatuses are both rotated in the direction of winding up, both ends of each rope are wound up, thus lifting the jig. When the hoisting apparatuses are rotated in the opposite directions to each other, one of the ends of each rope is extended and the other is wound up. By this operation, each of the jig-rotating wheels turns and the jig rotates about the horizontal axial line. The third system operates in the same manner.

In the first through third systems, if a pair of hoisting apparatuses are mounted on the hanger, the hanger is stopped right above the treatment bath and the hoisting apparatuses are rotated in the same direction; in this manner, the workpiece can be put into and taken out of the treatment bath by lowering and lifting the jig on which the workpiece is held. Further, by rotating the hoisting apparatuses in the opposite directions to each other, the workpiece can be rotated about the horizontal axial line.

In the third system, if the lower end of each rope is fixed to each of the jig-rotating wheels via position adjusting means, the adjustment of the posture of the jig can be performed by rotating each of the jig-rotating wheels through a small angle.

The jig is liable to swing in the horizontal direction because it is suspended by flexible means for suspending such as the wire ropes. In the second and third systems, however, the jig is prevented from swinging during lowering and lifting as well as during the rotating of the jig if paired guide frames to guide the lifting and lowering of the jig are provided in the treatment bath to engage with the shaft extension portion of each jig-rotating wheel. Furthermore, a pair of guide members can be suspended from the supporting frame of the hanger, which guide the lifting and lowering of the jig in engagement with the shaft extension portion of each jig-rotating wheel. When the hanger is positioned right above the treatment bath, the lower end of each of the guide members faces the upper end of each of the guide frames. In this manner, the shaft extension portion of each of the jig-rotating wheels can be smoothly inserted, when the jig is lowered, into each of the guide frames via the guide members.

The jig can also be prevented from swinging relative to the hanger during transporting. In order to more firmly position the jig relative to the hanger, engaging members for positioning the jig may be provided which engage with the supporting frame upon lifting of the jig. Further, if guide rails to guide the transporting of the hanger in engagement with the supporting frame are provided, the hanger is prevented from swinging in transporting, thus securing a stable transporting.

According to the fourth system, the jig is lowered or lifted by the rotation of the hoisting apparatus in the direction of extending or winding up the wire ropes, guided by the guide frame which is vertically provided in the treatment bath. The workpiece which is held by the jig is therefore put into or taken out of the treatment bath without swinging. During this operation, the pinion fixed to that shaft extension portion of the jig which is engaged with the guide frame, comes into engagement with the rack which is fixed to the guide frame. In accordance with the lowering or lifting movement of the jig, the shaft extension portion rotates within the bearing member which is supported by the wire rope, thus rotating the jig about the horizontal axial line.

In the fourth system, too, by mounting the hoisting apparatus on the hanger, the jig can be suspended from the hanger in a manner capable of lifting, lowering, and rotating.

According to the fourth system, because the jig is rotatably supported by the bearing member on the shaft, there is a possibility of self-rotating of the jig during transporting. Therefore, it is preferable that engaging members that are the same as those provided on the jig-rotating wheels in the second and third systems, be provided with the engaging members engaging with the supporting frame of the hanger when the jig is lifted, thereby preventing the jig from rotating when lifted.

In each of the first through fourth systems, the means for suspending can be wire rope, cable, chain or the like as suitably selected by a person of skill in the mechanical arts. The various terms of wire rope, cable, and chain are being interchangeably used in this specification.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
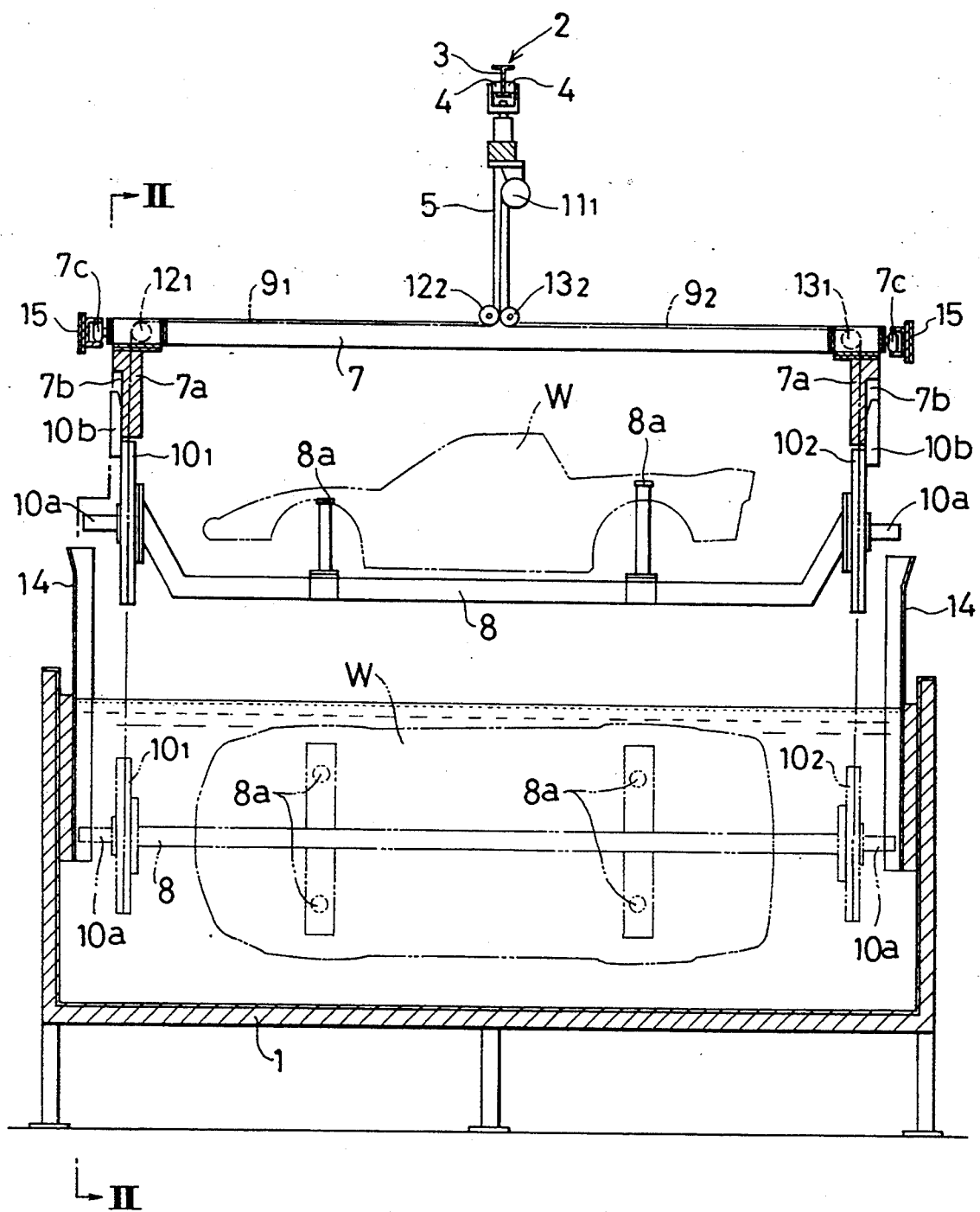
FIG. 1 is a sectional side view of one embodiment of a surface treatment apparatus of this invention.
Figure 2:
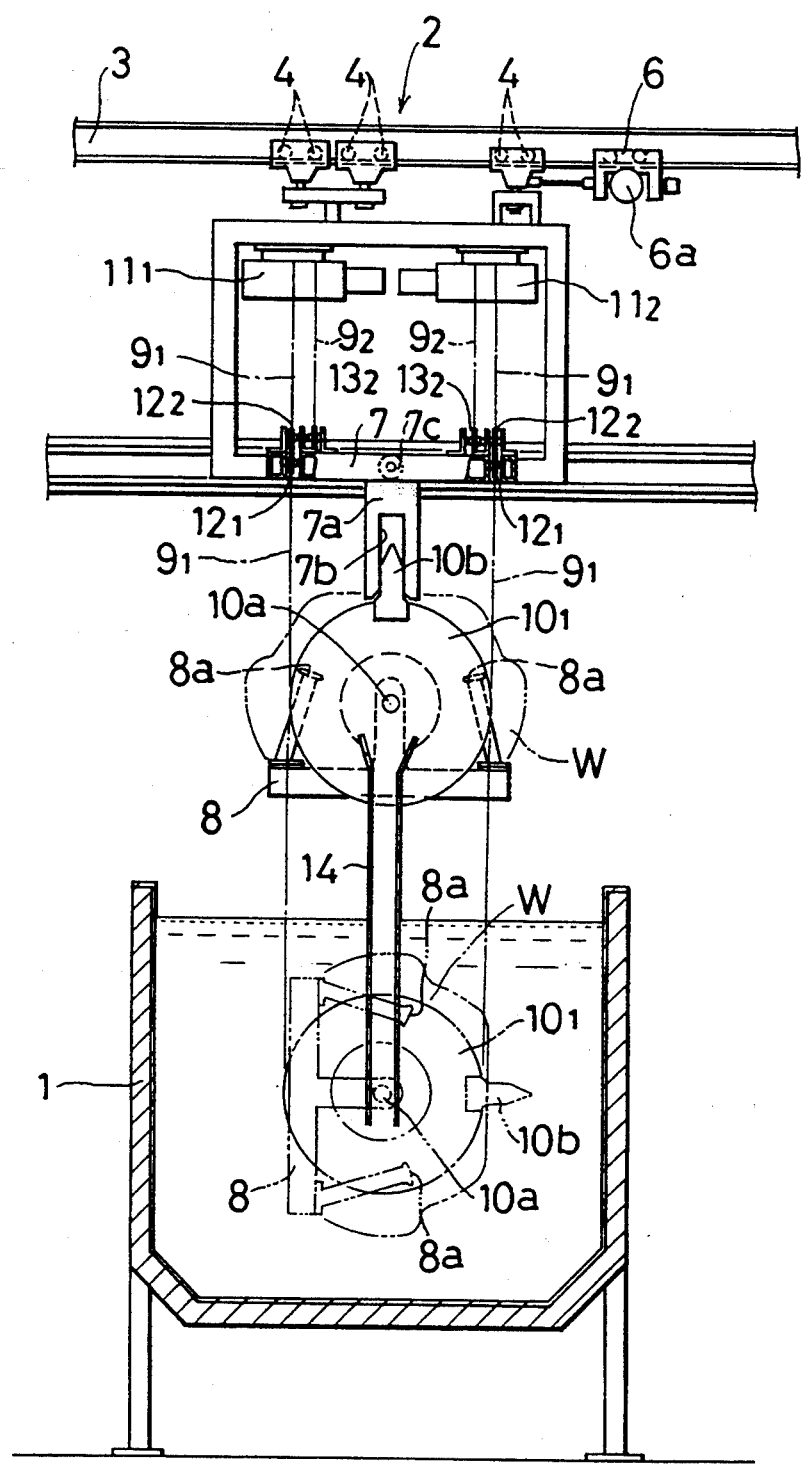
FIG. 2 is a sectional side view taken along the line II—II of FIG. 1.

Referring to the drawings, a treatment bath 1 is provided into which a vehicle body W, i.e., the workpiece, is immersed. A hanger conveyor 2 crosses an upper space of the treatment bath 1. The conveyor 2 comprises a hanger 5 which is suspended from a conveyor rail 3 by a plurality of rollers 4, and a driving member 6 with an electric motor 6a for self-propelling the hanger along the conveyor rail 3. The direction of transporting the vehicle body is hereinafter referred to as the lateral direction and the direction crossing the former at right angles is referred to as the longitudinal direction. A longitudinally extending supporting frame 7 is fixedly provided under the hanger 5. A longitudinally extending jig 8 which holds the vehicle body W is suspended from the supporting frame 7 by means for suspending which is shown as a pair of front and rear wire ropes or chains $9_1$, $9_1$.

The jig 8 is provided with a plurality of clamping members 8a which clamp the vehicle body W at suspension mounting holes or the like. Further, a pair of jig-rotating wheels $10_1$, $10_2$ comprising sprockets are fixed on both longitudinal ends of the jig 8 on the same horizontal axial line. A front rope $9_1$ comprising a chain is wound around the front jig-rotating wheel $10_1$, and a rear rope $9_2$ comprising a chain is wound around the rear jig-rotating wheel $10_2$.

A pair of left and right hoisting apparatuses $11_1$, $11_2$ are mounted on the hanger 5. A pair of left and right sprocket-like guide wheels $12_1$, $12_2$ for the front chain $9_1$ are mounted at the front and intermediate portions of the supporting frame 7. One end of the front chain $9_1$ is connected to the left hoisting apparatus $11_1$ via the left-side guide wheels $12_1$, $12_2$ and the other end of the chain $9_1$ is connected to the right hoisting apparatus $11_2$ via the right-side guide wheels $12_1$, $12_2$. A pair of left and right sprocket-like guide wheels $13_1$, $13_2$ for the rear chain $9_2$ are mounted at the rear and intermediate portions of the supporting frame 7. One end of the rear chain $9_2$ is connected to the left hoisting apparatus $11_1$ via the left-side guide wheels $13_1$, $13_2$ and the other end of the chain $9_2$ is connected to the right hoisting apparatus $11_2$ via the right-side guide wheels $13_1$, $13_2$.

If both hoisting apparatuses $11_1$, $11_2$ are rotated in the direction of extending or winding up the chains, both ends of both chains $9_1$, $9_2$ are respectively extended or wound up to lower or lift the jig 8 while maintaining it in its horizontal posture. If, on the other hand, the hoisting apparatuses $11_1$, $11_2$ are rotated in the opposite directions to each other, one end of each chain $9_1$, $9_2$ is extended and the other end thereof is wound up to rotate the jig 8 about the horizontal axis via the chains $9_1$, $9_2$.

Each of the jig-rotating wheels $10_1$, $10_2$ is provided, on its external surface, with a shaft extension portion 10a which projects outwards on the axial line, and an engaging member 10b which projects radially outwards. A pair of guide frames 14, 14 of U-shape in horizontal cross section are vertically provided on the front and rear ends of the treatment bath 1 such that each of the guide frames 14, 14 engages with the shaft extension portion 10a of the respective jig-rotating wheels $10_1$, $10_2$ to guide the lifting and lowering of the jig 8. The supporting frame 7 is provided, on its front and rear ends, with vertically downwardly extending leg pieces 7a, 7a. When the jig 8 is lifted to its uppermost position, the engaging member 10b on each of the jig-rotating wheels $10_1$, $10_2$ engages with a positioning groove 7b formed in each of the leg pieces 7a so that the jig 8 may be positioned in its lateral and longitudinal directions, as well as in its rotational position relative to the hanger 5.

Guide rollers 7c, 7c are provided at the front and rear ends of the supporting frame 7. A pair of longitudinal guide rails 15 are provided in parallel with the conveyor rail 3 and receive each of the guide rollers 7c in order to guide the movement of the hanger 5.

Next, the operation of this embodiment is explained. After the hanger 5 is stopped right above the treatment bath 1, the pair of hoisting apparatuses $11_1$, $11_2$ are both rotated in the direction of extending the chains $9_1$, $9_2$ until the jig 8 is lowered down to a position at which the engaging members 10b are released from their engagement with the grooves 7b. Then, one of the hoisting apparatuses $11_1$, $11_2$ is rotated in the winding-up direction with the other kept in the extending direction in order to rotate the vehicle body W 90 degrees to a "lie-on-side" posture. The hoisting apparatuses $11_1$, $11_2$ are again rotated both in the extending direction in order to lower the jig 8 to a lowermost position guided by the guide frames 14, 14, thus putting the vehicle body W into the treatment bath 1 in the "lie-on-side" posture. Thereafter, one of the hoisting apparatuses $11_1$, $11_2$ is rotated in the winding-up direction and the other in the extending direction in order to pivot the jig 8, 180 degrees in the direction opposite to the above-mentioned direction. The vehicle body W is thus reversed in its posture to the opposite "lie-on-side" posture. By this reversing, the vehicle body W can be cleared of air trapped inside the recesses of the body, so that the entire vehicle body W may be surface-treated without irregularities.

After the treatment, both hoisting apparatuses $11_1$, $11_2$ are rotated in the winding-up direction in order to lift the jig 8 while maintaining the vehicle body W in the opposite "lie-on-side" posture. When the vehicle body W has been taken out of the treatment bath 1, one of the hoisting apparatuses $11_1$, $11_2$ is rotated in the extending direction and the other thereof in the winding-up direction in order to return the vehicle body W to the horizontal posture by rotating the jig 8, 90 degrees. Then, both hoisting apparatuses $11_1$, $11_2$ are again rotated in the winding-up direction to lift the jig 8 to an uppermost position. The engaging members 10b engage with the grooves 7b to fix the position of the jig 8 relative to the hanger 5. Thereafter, the hanger 5 is transported to the position of the next treatment bath guided by the guide rollers 7c in the guide rails 15.

Figure 3:
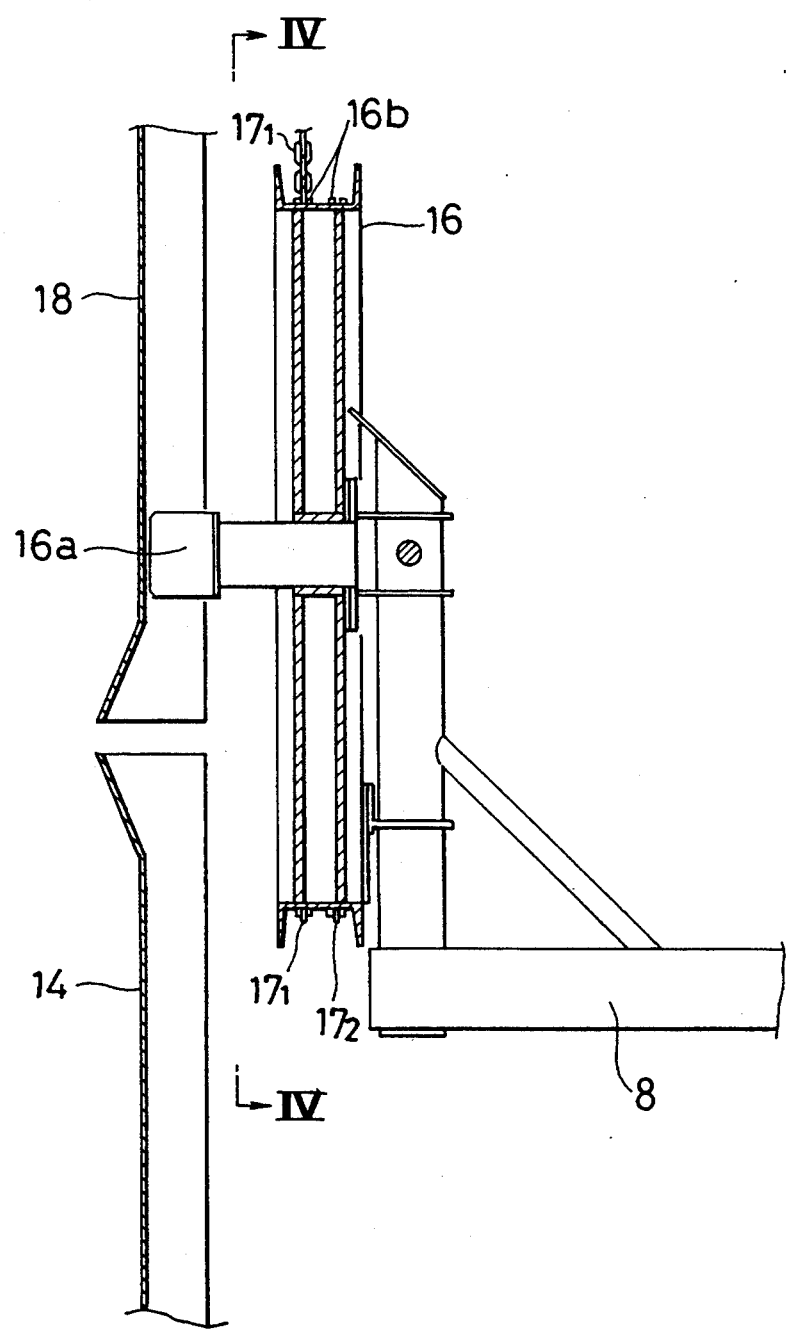
FIG. 3 is a sectional side view of an important portion of a second embodiment.
Figure 4:
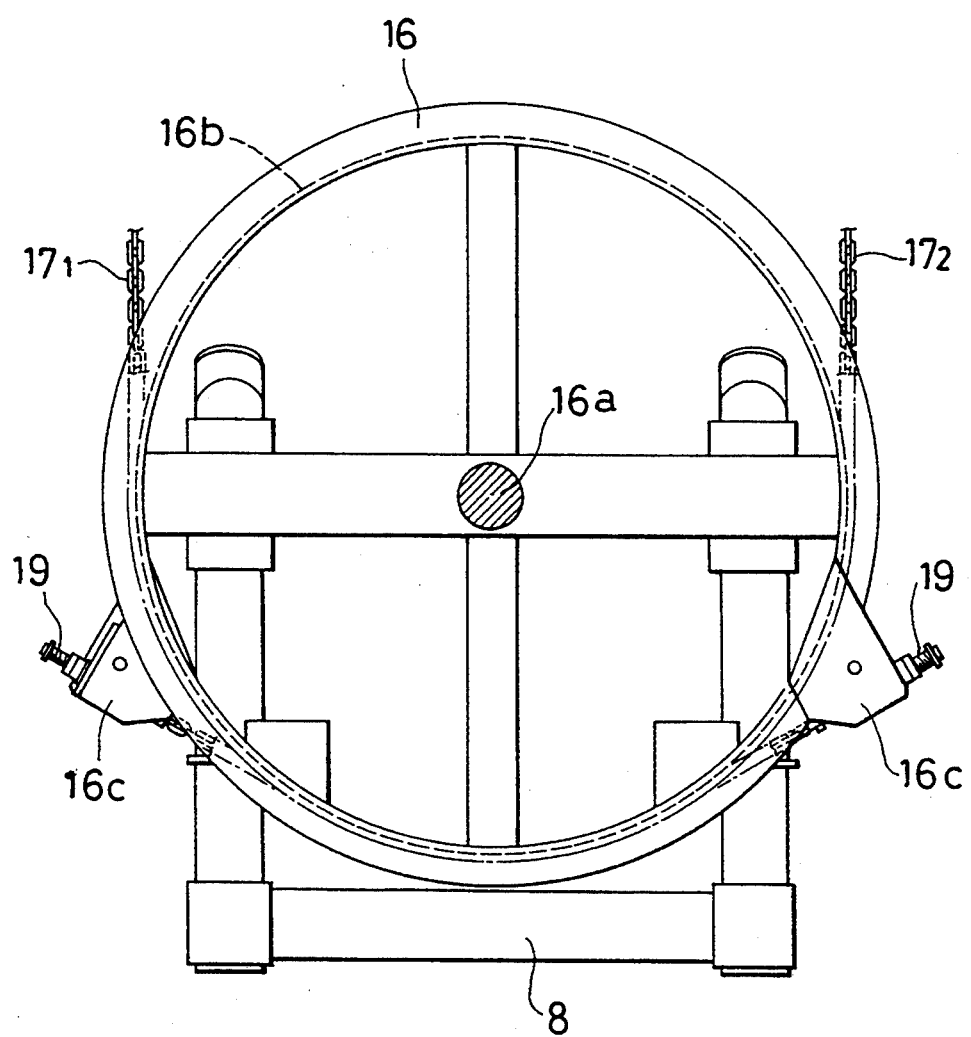
FIG. 4 is a sectional side view taken along the line IV—IV of FIG. 3.

In the above-mentioned embodiment, each of the chains $9_1$, $9_2$ is wound around each of the jig-rotating wheels $10_1$, $10_2$ in a U-shape. Another embodiment is shown in FIGS. 3 and 4. A pair each of wire ropes $17_1$, $17_2$ are wound in opposite directions around each one of the jig-rotating wheels 16 which are fixed at both longitudinal ends of the jig 8 on the same horizontal axial line. One end of each of the wire ropes $17_1$, $17_2$ is fixed to the jig-rotating wheel 16. The jig 8 is suspended from a hanger as in the first embodiment by a pair of the wire ropes for each jig-rotating wheel 16 (a total of four for the jig 8). In this case, one wire rope $17_1$, wound around one of the jig-rotating wheels 16 as shown in FIGS. 3 and 4 and the corresponding wire rope wound around the other jig-rotating wheel in the same direction are connected to one of the lifting apparatuses in the same manner as the one end of the pair of chains $9_1$, $9_2$ in the first embodiment. The other wire rope $17_2$ wound around the one jig-rotating wheel 16 and the corresponding other wire rope wound around the other jig-rotating wheel in the same direction are connected to the other lifting apparatus in the same manner as the other end of the pair of chains $9_1$, $9_2$ in the first embodiment. In operation, the jig 8 can be lifted and lowered and rotated about a horizontal axis in the same manner as the first embodiment.

In the second embodiment, guide members 18 of U-shape in horizontal cross section for guiding the lifting and lowering of the jig 8 in engagement with the shaft extension portions 16a of the jig-rotating wheels 16, are suspended from a supporting frame (not shown) of the hanger. Thus, when the hanger is right above the treatment bath, the lower ends of the guide members 18 face the upper ends of the guide frames 14 which are vertically provided in the treatment bath. In lowering the jig 8, the shaft extension portions 16a are smoothly inserted into the guide frames 14 guided by the guide members 18.

Figure 5:
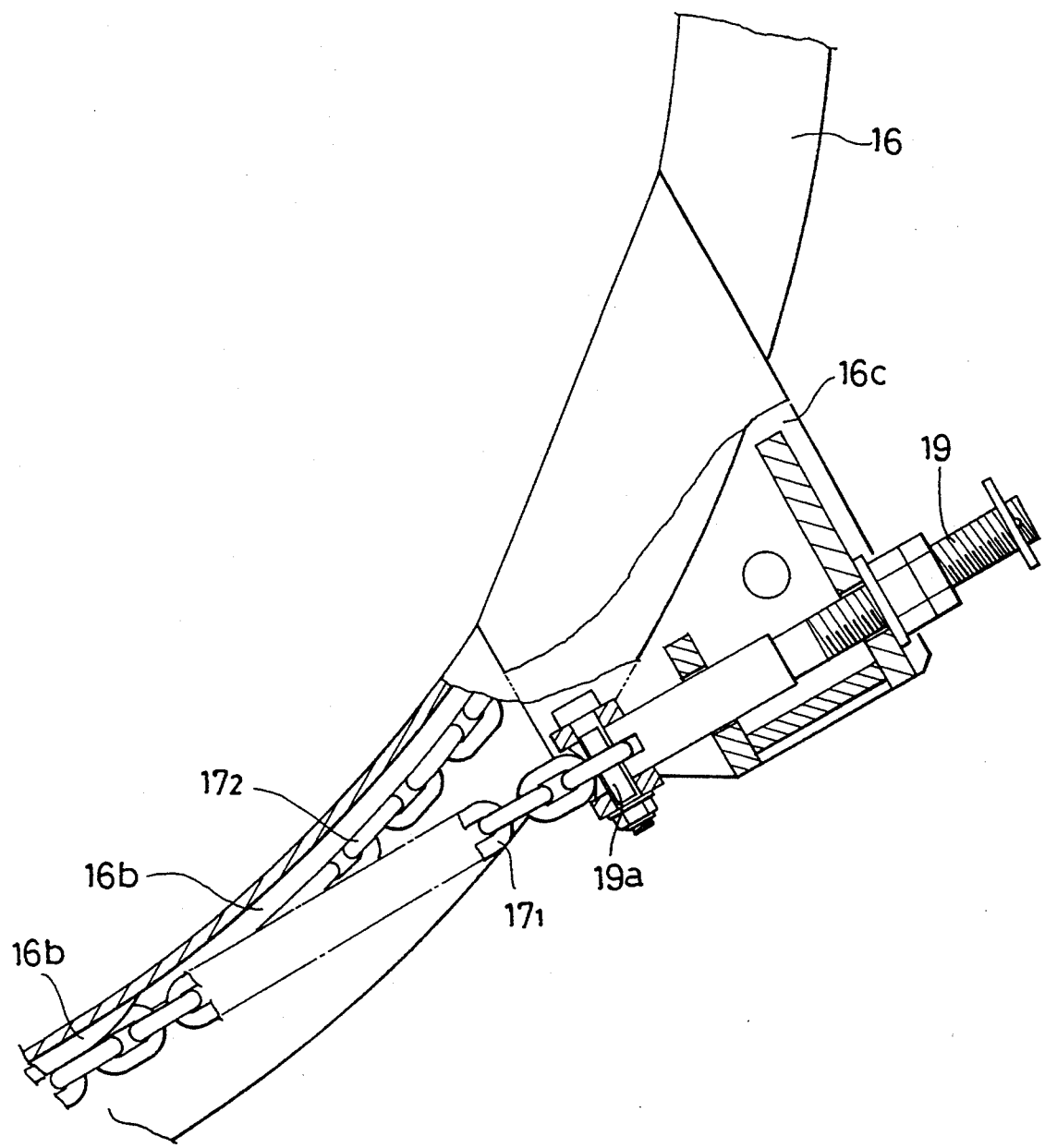
FIG. 5 is an enlarged view of an adjusting means to be provided on a jig-rotating wheel of the related embodiment of this invention.

A pair of winding grooves 16b are formed in each of the jig-rotating wheels 16 to prevent the two wire ropes $17_1$, $17_2$ wound therearound from entangling with each other. A pair of brackets 16c, 16c are fixedly provided on the pivotal wheel 16 in symmetrical right and left positions. As shown in FIG. 5, an adjusting bolt 19 is provided on each bracket 16c as a means of adjusting the posture of the jig 8. One end of the means for suspending (shown as a chain) constituting each of the wire ropes $17_1$, $17_2$ is engaged with a cross pin 19a which is laterally provided at a divided portion at a tip of the adjusting bolt 19. In this manner, by the operation of the adjusting bolt 19, the effective length of the chain is changed thereby adjusting the posture of the jig 8.

In the first embodiment, when wire ropes or chains $9_1$, $9_2$ derail from the jig-rotating wheels $10_1$, $10_2$, the jig 8 will be dropped. However, in the second embodiment, since one end of each wire rope or chain $17_1$, $17_2$ is fixed to the jig-rotating wheel 16, the jig 8 will not be dropped even if the wire ropes $17_1$, $17_2$ were derailed from the jig-rotating wheel 16; thus safety is ensured.

Figure 6:
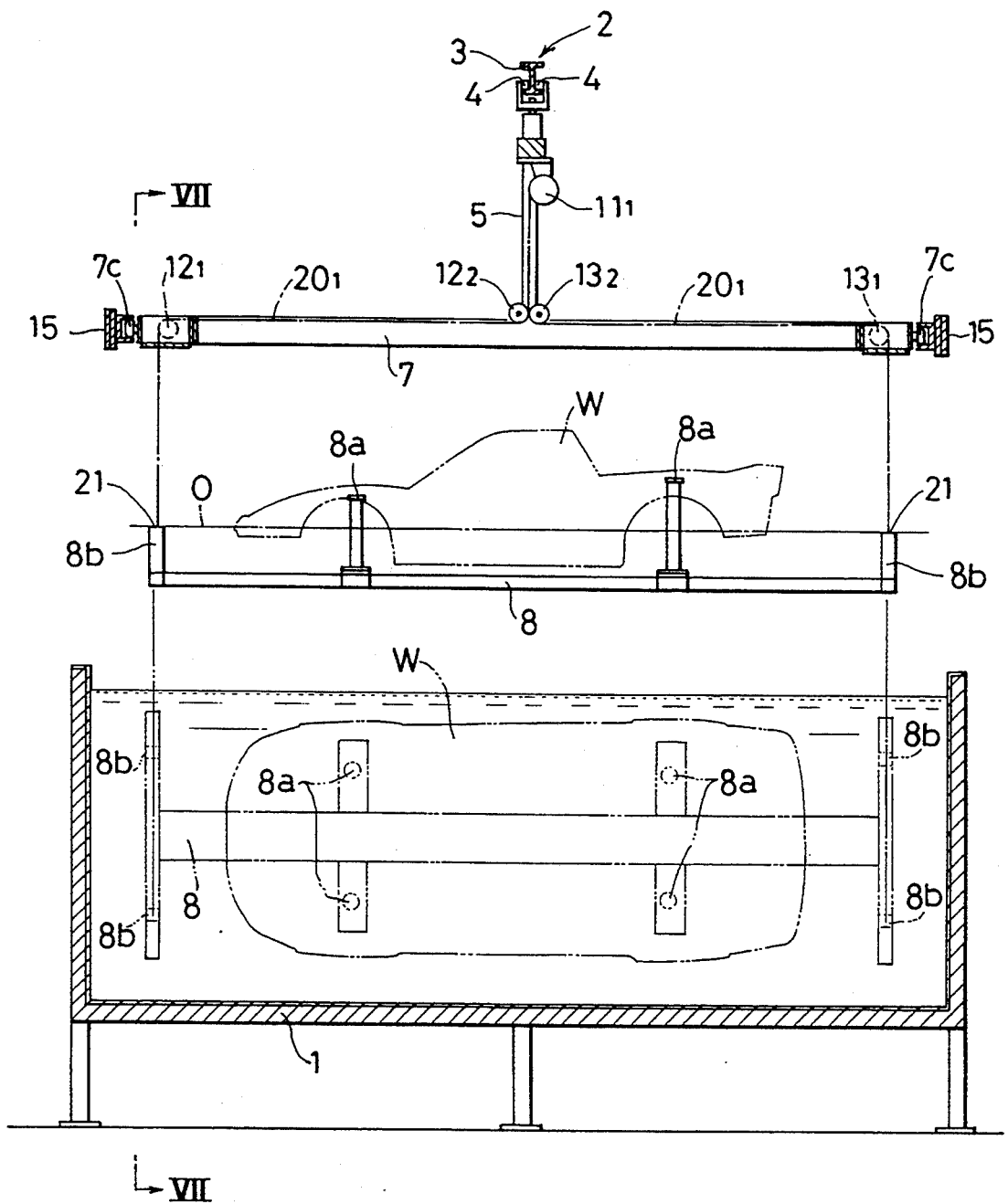
FIG. 6 is a sectional side view of a third embodiment of this invention.
Figure 7:
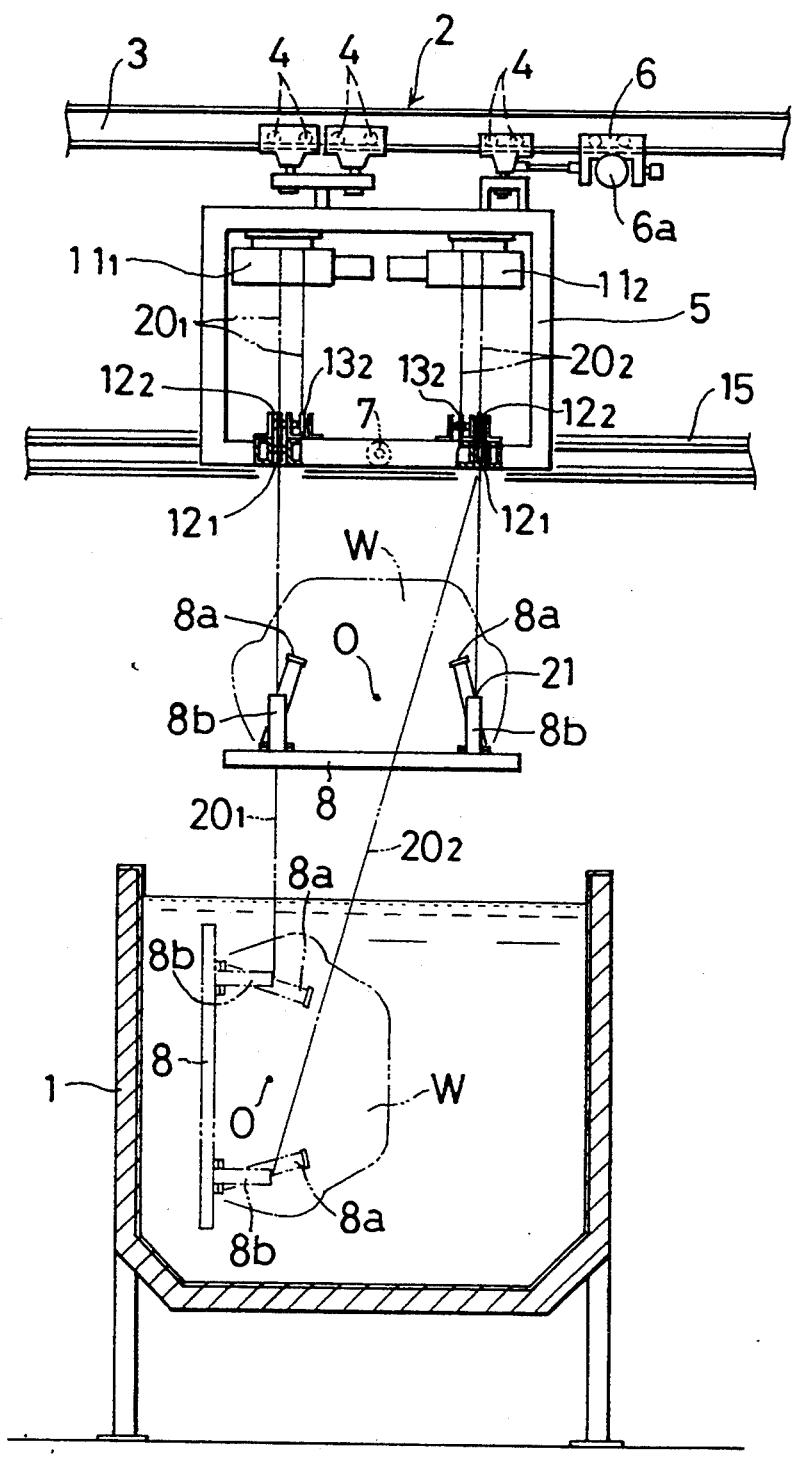
FIG. 7 is a sectional side view taken along the line VII—VII of FIG. 6.

FIGS. 6 and 7 show a third embodiment. In this embodiment, a pair of right and left suspending rods 8b, 8b are vertically provided at the front and rear ends of the jig 8. The jig 8 is suspended from the supporting frame 7 of the hanger 5 at these suspending rods 8b via a pair of the right and left wire ropes $20_1$, $20_2$ at each of the front and rear ends. A pair of right and left hoisting apparatuses $11_1$, $11_2$ are mounted on the hanger 5 in the same manner as in the above-mentioned embodiment. The left wire ropes $20_1$, $20_1$, in the front and rear portions are connected to the left lifting apparatus 11, via the left guide wheels $12_1$, $12_2$; $13_1$, $13_2$ which are disposed on the supporting frame 7 in the same manner as in the first embodiment. The right wire ropes $20_2$, $20_2$ in the front and rear portions are connected to the right hoisting apparatus $11_2$ via the right guide wheels $12_1$, $12_2$; $13_1$, $13_2$. By rotating both of the lifting apparatuses $11_1$, $11_2$ in the extending direction or in the winding-up direction, the jig 8 can be lowered or lifted while maintaining the jig 8 in a horizontal posture.

The right and left suspension rods 8b, 8b on each end of the jig 8 are disposed such that the suspension points 21, 21 at the upper end of the suspension rods 8b, 8b are symmetrical relative to the horizontal axis 0 which is the center of rotation of the vehicle body W. Thus, if the lifting apparatuses $11_1$, $11_2$ are rotated in the opposite directions to each other, the jig 8 can be rotated 90 degrees respectively in either direction about the axial line 0. According to this embodiment, the vehicle body W can be inverted 180 degrees from one "lie-on-side" posture to the other "lie-on-side" posture, and the surface treatment of the procedures as in the first embodiment can be performed.

Figure 8:
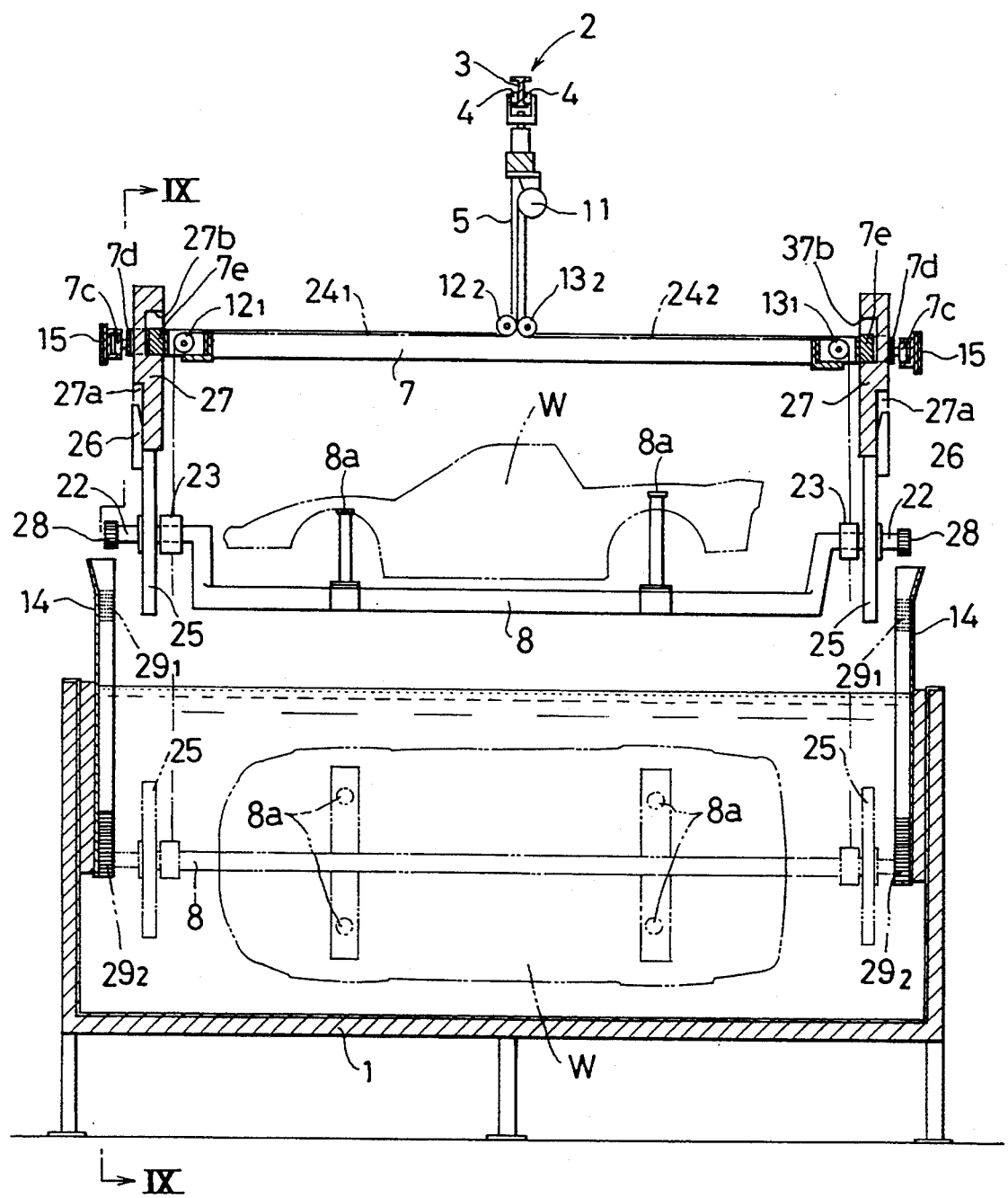
FIG. 8 is a sectional side view of a fourth embodiment.
Figure 9:
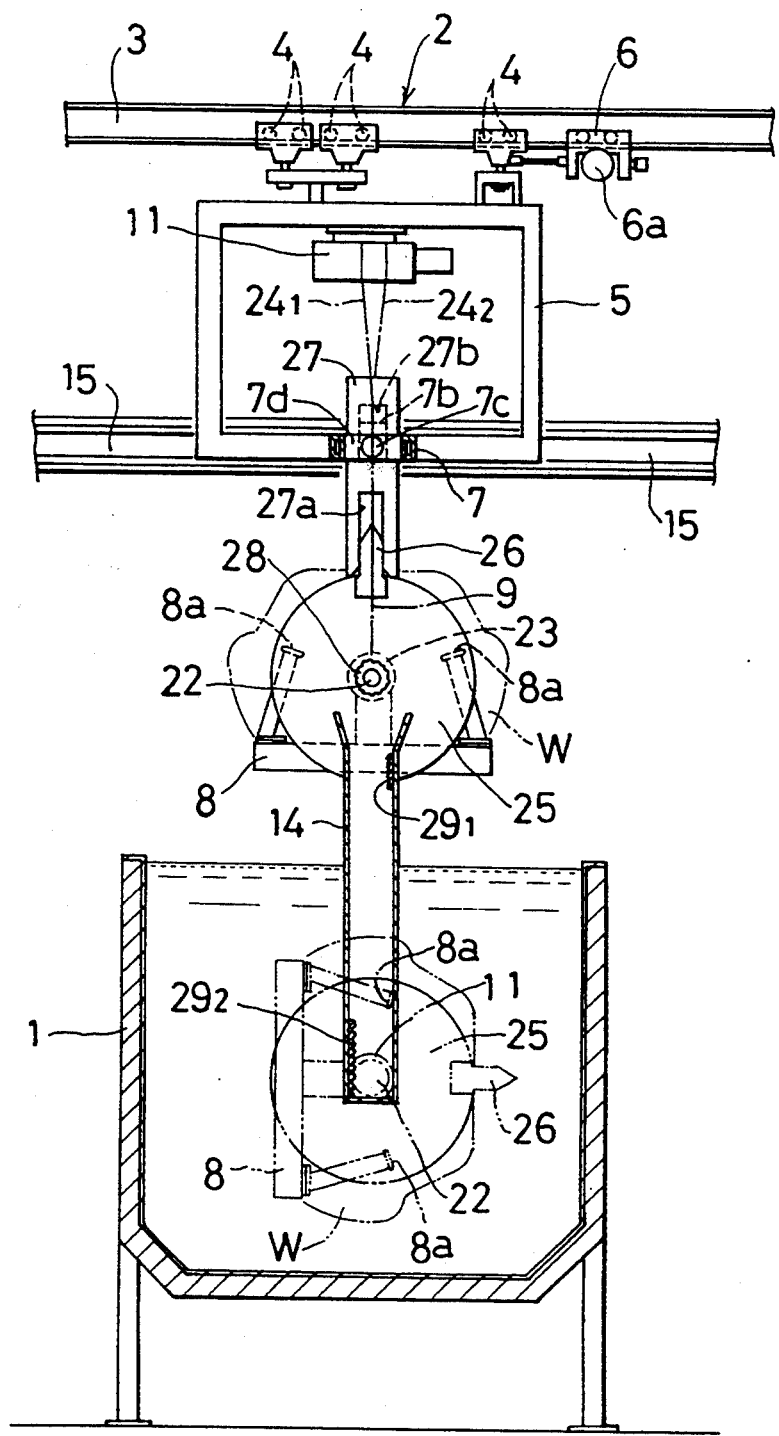
FIG. 9 is a sectional side view taken along the line IX—IX of FIG. 8.

FIGS. 8 and 9 show a fourth embodiment. In this embodiment, a pair of shaft extension portions 22, 22 are projectingly provided on both front and rear ends of the jig 8 on the same horizontal axial line. Bearing members 23, 23 are externally inserted into the respective shaft extension portions 22, 22 and rotatably support the jig 8. A pair of front and rear wire ropes $24_1$, $24_2$, one end of each being connected to each of the bearing members 23, 23, are provided such that the jig 8 is rotatably suspended about a horizontal axial line by the wire ropes $24_1$, $24_2$ via the bearing members 23, 23. A common hoisting apparatus 11 is mounted on the hanger 5. The front wire rope $24_1$ is connected to the hoisting apparatus 11 via pulley-like guide wheels $12_1$, $12_2$ which are provided respectively in the laterally central positions of the front and intermediate portions of the supporting frame 7 at the lower end of the hanger 5. The rear wire rope $24_2$ is connected to the hoisting apparatus 11 via pulley-like guide wheels $13_1$, $13_2$ which are provided respectively in the laterally central positions of the rear and intermediate portions of the supporting frame 7. If the hoisting apparatus 11 is rotated counterclockwise or clockwise as seen in FIG. 8, both of the wire ropes $24_1$, $24_2$ are extended or wound up so that the jig 8 can be lowered or lifted while maintaining its horizontal posture.

Each of the shaft extension portions 22 is provided with a disk 25. The disk 25 is provided with an engaging member 26 which extends upwards. Receiving members 27 are provided at the ends of the supporting frame 7 which have formed thereon guide grooves 27a for the engaging members 26, the receiving members 27 corresponding to the leg pieces 7a of the first embodiment. When the jig 8 is lifted, the engaging members 26 come into engagement with the guide grooves 27a, so that the jig 8 is prevented from rotating and is longitudinally and laterally positioned relative to the hanger 5. The receiving members 27 are inserted into U-shaped brackets 7d which are provided on the end surfaces of the supporting frame 7. The guide projections 7e provided at the ends of the frame 7 are made to fit into vertically elongate grooves 27b which are formed along the upper internal side surfaces of the receiving members 27, so that the receiving members 27 are free to move for a predetermined downward stroke relative to the supporting frame 7.

In this fourth embodiment, the guide rollers 7c engageable with the guide rails 15 for the hanger of the first embodiment are provided outside the bracket 7d.

Guide frames 14, 14 of U-shape in horizontal cross section are vertically provided, like in the first embodiment, on both front and rear ends of the treatment bath 1. In this fourth embodiment, however, each of the guide frames 14 is formed so as to guide the lifting and lowering of the jig 8 in engagement with each of the shaft extension portions 22. A pinion 28 is fixed to each of the shaft extension portions 22. Racks $29_1$, $29_2$ engageable by the pinion 28 are provided on an upper portion of one side and on a lower portion of the other side of each of the guide frames 14. The upper rack $29_1$ is formed in a length equivalent to one quarter of the circumference of the pinion 28 and the lower rack $29_2$ is formed in a length equivalent to one half of the circumference of the pinion 28.

Next, the operation of this embodiment is explained. After the hanger 5 is first stopped right above the treatment bath 1, the hoisting apparatus 11 is rotated in the direction of extending the wire ropes $24_1$, $24_2$ in order to lower the jig 8. During this operation, the receiving member 27 lowers by its own weight to a predetermined position while maintaining the engagement with the engaging member 26. When the shaft extension portion 22 of the jig 8 is inserted into the guide frame 14, and the pinion 28 starts engaging with the upper rack $29_1$, the engaging member 26 is detached downwards away from the receiving member 27. By the succeeding lowering of the jig 8, the jig 8 is rotated 90 degrees in the counterclockwise direction in FIG. 9 by the pinion 28. The vehicle body W thus assumes a "lie-on-side" posture and is put into the treatment bath 1 in this condition. Then, the pinion 28 comes into engagement with the lower rack $29_2$. The jig 8 is thus rotated 180 degrees in the clockwise direction with the lowering of the jig 8. The vehicle body W is consequently inverted into a "lie-on-side" posture which is opposite to the above-mentioned posture, inside the treatment bath 1. Then, in the area in which the pinion 28 engages with the rack $29_2$, the jig 8 is appropriately lifted and lowered to repeat the inversion of the vehicle body W. By this inversion of the vehicle body W, it can be cleared of air trapped in recesses therein, thereby uniformly surface-treating the vehicle body W.

After the surface treatment, the jig 8 is lifted to take the vehicle body W out of the treatment bath 1. At this time, the vehicle body W returns to its horizontal posture by the rotation of the jig 8 through the engagement of the pinion 28 with the upper rack $29_1$. At the same time, the engaging members 26 engage with the receiving members 27 which are in the lowered position, thereby stopping the jig 8 from rotating. Thereafter, the jig 8 is lifted to the position shown in the figure while pushing up the receiving members 27. The hanger 5 is then transported to the next treatment position.

It may be so arranged that a hoisting apparatus and a jig which is suspended therefrom via wire ropes are disposed above a treatment bath, whereby the workpiece is handed over between a hanger and the jig to put the workpiece into or take it out of the treatment bath. However, if the jig 8 is suspended from the hanger 5 as in the above described embodiments, the handing over of the workpiece becomes unnecessary. Therefore, it is possible to increase the efficiency of the work, simplify the equipment, and to cope easily with enlarging the number of the treatment baths.

It is readily apparent that the above-described has the advantage of wide commercial utility. It should be understood that the specific form of the invention herein-above described is intended to be representative only, as certain modifications within the scope of these teachings will be apparent to those skilled in the art.

Accordingly, reference should be made to the following claims in determining the full scope of the invention.

What is claimed is:

1. A surface treatment apparatus having a treatment bath for immersing and treating a workpiece therein, with the workpiece being put into and taken out of said treatment bath by the lifting and lowering thereof and with the workpiece being rotatable about a horizontal axial line while in the bath, said apparatus comprising:
   a jig which holds a workpiece;
   a pair of jig-rotating wheels fixed on the same horizontal axial line at both ends of said jig wherein each of said jig-rotating wheels has a shaft extension portion extending axially along said horizontal axial line;
   four means for suspending said jig paired at each end of said jig, lower ends of said each pair being fixed to each of said jig-rotating wheels by winding therearound in the opposite directions to each other;
   a pair of guide frames vertically provided in said treatment bath, said guide frames guiding the lifting and lowering of said jig in engagement with said shaft extension portion; and
   a pair of hoisting apparatuses wherein said four means are divided into two sets having respectively two means of the same winding direction, upper ends of two means of one set being connected to one of said hoisting apparatuses, upper ends of two means of the other set being connected to the other of said hoisting apparatuses.

2. A surface treatment apparatus according to claim 1, wherein the lower end of each of said means is fixed to each of said jig-rotating wheels via position adjusting means.

3. A surface treatment apparatus according to claim 2, further comprising:
   a hanger conveyor for transporting the workpiece;
   a hanger on said hanger conveyor; and
   a supporting frame having guide wheels for guiding each of said means fixed to said hanger of said conveyor, wherein both of said hoisting apparatuses are mounted on said hanger;
   said apparatus further comprising:
   a pair of guide members vertically downwardly provided on said supporting frame, said guide members guiding said jig in engagement with said shaft extension portion of each of said jig-rotating wheels,
   wherein when said hanger is positioned right above said treatment bath, a lower end of each of said guide members faces an upper end of each of said guide frames, said guide frames guiding the lifting and lowering of said jig in engagement with said shaft extension portion of each of said jig-rotating wheels.

4. A surface treatment apparatus according to claim 3, further comprising engaging members for positioning said jig which engage with said supporting frame upon lifting of said jig provided on each of said jig-rotating wheels.

5. A surface treatment apparatus according to claim 1, further comprising a hanger conveyor for transporting the workpiece; a hanger on said hanger conveyor; and a supporting frame having guide wheels for guiding each of said means fixed to said hanger of said conveyor; and wherein both of said hoisting apparatuses are mounted on said hanger.

6. A surface treatment apparatus according to claim 5, wherein each of said jig-rotating wheels has a shaft extension portion extending axially along said horizontal axial line; and said apparatus further comprises a pair of guide members vertically downwardly provided on said supporting frame, said guide members guiding said jig in engagement with said shaft extension portion of each of said jig-rotating wheels, a pair of guide frames vertically provided in said treatment bath such that, when said hanger is positioned right above said treatment bath, a lower end of each of said guide members faces an upper end of each of said guide frames, said guide frames guiding the lifting and lowering of said jig in engagement with said shaft extension portion of each of said jig-rotating wheels.

7. A surface treatment apparatus according to claim 13, further comprising:
- a hanger conveyor for transporting the workpiece;
- a hanger on said hanger conveyor; and
- a supporting frame having guide wheels for guiding each of said means fixed to said hanger of said conveyor;

said apparatus further comprising:
- a pair of guide members vertically downwardly provided on said supporting frame, said guide members guiding said jig in engagement with said shaft extension portion of each of said jig-rotating wheels, wherein when said hanger is positioned right above said treatment bath, a lower end of each of said guide members faces an upper end of each of said guide frames, said guide frames guiding the lifting and lowering of said jig in engagement with said shaft extension portion of each of said jig-rotating wheels.

8. A surface treatment apparatus according to claim 7, further comprising engaging members for positioning said jig which engage with said supporting frame upon lifting of said jig provided on each of said jig-rotating wheels.

9. A surface treatment apparatus according to claim 8, further comprising guide rails for guiding the movement of said hanger in engagement with said supporting frame.

* * * * *

UNITED STATES PATENT AND TRADEMARK OFFICE
CERTIFICATE OF CORRECTION

PATENT NO.   : 5,433,783
DATED        : July 18, 1995
INVENTOR(S)  : ICHINOSE et al.

It is certified that error appears in the above-identified patent and that said Letters Patent is hereby corrected as shown below:

Title Page, [30], after "2-61279" insert --U--.

Column 11, line 10, delete "13" and substitute --1--.

Signed and Sealed this

Twenty-fourth Day of October, 1995

Attest:

BRUCE LEHMAN

*Attesting Officer*     *Commissioner of Patents and Trademarks*